Patented June 1, 1948

2,442,532

UNITED STATES PATENT OFFICE 2,442,532

TREATMENT OF GLYCERIDES FOR USE IN EDIBLE FATS

Eddy W. Eckey, Wyoming, Ohio, assignor to The Procter & Gamble Company, Cincinnati, Ohio, a corporation of Ohio No Drawing. Application November 13, 1945, Serial No. 628,372

19 Claims. (Cl. 260—410.7)

This invention relates to the preparation of fats for use in food products, and more particularly to the production of plastic fats, confectioners' hard butter, and related products.

The term "fat" is used generically to cover both fats and fatty oils.

This application is a continuation-in-part of application Serial No. 514,665, filed December 17, 1943, now abandoned.

In my copending application Serial No. 562,062, filed November 6, 1944, for "Process for treating fats and fatty oils," I have disclosed how interesterification (a term synonymous with "molecular rearrangement" as used therein) of fats constituted of combined fatty acids whose molecular structures differ in respects affecting solubility of glycerides thereof in the glyceride system may be brought about by a treatment of the fats with a suitable low temperature interesterification catalyst at a temperature sufficiently low that insoluble glycerides, as they are formed, crystallize out from the reaction mixture thereby inducing a continuation of the interesterification reaction to such an extent that the physical properties of a batch of fat are changed and may be controlled to produce products within a desired range of properties, such as melting point and solidifying point.

As explained more fully in the aforesaid copending application, Serial No. 562,062, my process differs radically from the ordinary molecular interchange reactions which are conducted wholly in the liquid phase. In the latter process which involves heating a natural glyceride fat or mixture of fats to a temperature substantially above the melting point in the presence of a suitable catalyst, an interchange or rearrangement of fatty acid radicals occurs. Since this interchange of radicals is reversible, the constitution of the glyceride fat molecules after continuance of such a reaction at high temperature for some time is in accordance with the operation of the law of probabilities, and the final result can be predicted from a knowledge of the nature of the fatty acids constituting the fat or mixture of fats.

The invention of my aforementioned earlier applications as briefy indicated above is based on the discovery that under the proper conditions of treatment rearrangement of fatty acid radicals may be directed and controlled to achieve results not heretofore obtained. In this connection I have found that if the fat, at least a part of which is liquid, is admixed with a suitable catalyst and rearrangement is permitted to take place at a temperature below that at which the liquid phase is saturated with respect to relatively high melting triglycerides, such high melting triglycerides formed in the course of the interchange of fatty acid radicals will crystallize from the liquid fat and take no further part in the interchange process. Thus, as molecules having low solubility in the liquid fat phase are formed and crystallize out of solution, further rearrangement of such molecules (such as would occur in the conventional single phase reaction) is prevented; consequently the percentage of higher melting molecules present in the whole fat mixture tends to increase as long as crystallization continues. Crystallization of such relatively insoluble solid triglycerides can continue as long as the solubility thereof in the liquid fat phase at the temperature of reaction is exceeded by the amount newly formed in the reaction.

Completely saturated triglycerides, such as tristearin and tripalmitin, are least soluble in the liquid constituents, and therefore, unless special precautions or modifications of conducting the process, such as seeding and the use of special temperature control, to induce the crystallization of a particular type of glyceride are taken, practice of the process on the average fat will result to a large extent in the crystallization of completely saturated triglycerides and, accordingly, in the conversion of a large proportion of mixed saturated-unsaturated triglycerides into completely saturated triglycerides and completely unsaturated triglycerides.

In the present application, which relates to the general subject matter of the aforementioned application Serial No. 562,062, it is my object to explain a specific development within the broad field of interesterification (or synonymously molecular rearrangement) of fats in the preparation of fats for use in the manufacture of edible products.

It is also my object to explain how the range of fats utilizable for edible fatty products may be increased, how the properties of edible fats especially plastic fats may be improved by controlled interesterification, and how the use of hitherto necessary processing steps such as hydrogenation in the production of plastic fats may be minimized or avoided.

As above indicated, low temperature interesterification, which I have invented, is of value in the manufacture of edible fats for use in the manufacture of food products. These include plastic shortenings for general use, (and also for specific use as in the making of puff pastries), margarine oil, confectioners' hard butter, cooking oil, salad oil and the like. The various applications of the process will be taken up individually for discussion.

In order to explain various processing conditions wherein controlled interesterification or molecular rearrangement may be applied in the field of plastic fat manufacture, I will give fourteen different examples of the use of the process in this application of my invention. Examples 1–7 show the application of the process to fats which are liquid or very soft at temperatures above 70° F., for example a fat having from about 15 per cent to about 40 per cent combined saturated fatty acids having 16 or more carbon atoms per molecule and one which, when rearranged, does not have more than the desired content of saturated triglyceride for plastic fat production. Remaining Examples 8–14 show how the process may be applied to fats which have 20 per cent or more of combined saturated fatty acids of 16 or more carbon atoms and which, after rearrangement, have more solid triglyceride than is desirable for plastic fat production.

It should be understood that variants of the specific steps recited in the examples given and the use of the process on fats other than those specifically noted, will readily occur to those skilled in the art, the purpose of the examples being to disclose some of the variants in the practical application of the process which will suggest other variants within the scope of my invention.

*Example 1.*—100 parts of refined and filtered cottonseed oil having an iodine value of 109.3 according to the Wijs method of determination and a cloud point of 27.5° F. were dried. The oil was cooled to 120° F. in a flask arranged to exclude air and then mixed for 30 minutes mechanically with 0.2 parts of sodium methoxide in the form of a 10% suspension in xylene. This catalyst was prepared by the gradual addition of dry methanol to an equivalent quantity of finely divided metallic sodium suspended in xylene during vigorous agitation.

The mixture of oil and catalyst was chilled at 50° F. until crystals of solid fat began to separate from the oil, and then set aside at 70° F. for 3 days. At the expiration of the 3-day period, the mixture had become solid in appearance. Subsequently, the congealed mass was treated with a 20% hydrochloric acid solution to render the sodium methoxide catalyst inactive and then washed with hot water to remove the hydrochloric acid. The resulting rearranged fat was found to have an iodine value of 109.5, checking closely the iodine value of the original oil, and indicating substantially no change in the ratio of saturated to unsaturated constituents. The cloud point determination was 88.2° F., showing a considerable "hardening" of the fat by the rearrangement process. The product was then refined with sodium hydroxide solution to reduce a slight increase in free fatty acid occasioned by prior treatment, and then bleached with fuller's earth.

In order to determine the change effected in the content of saturated triglycerides, a sample of the product was dissolved in a 10-fold volume of petroleum ether, gradually cooled to and stored at 40° F. for 24 hours. The solid triglycerides which separated amounted to 13% of the fat originally dissolved and had an iodine value of 4.5. The original cottonseed oil did not separate solid triglycerides under similar treatment.

The refined rearranged oil was then passed over a chilled roll and through a picker box in accordance with accepted methods and thereby converted into a plastic shortening stable at ordinary room temperature.

*Example 2.*—A mixture of 40% refined and filtered peanut oil (iodine value=87.9) and 60% refined and filtered cottonseed oil (iodine value =109.0) was dried and mixed with 0.2% sodium methoxide in the form of a 10% suspension in xylene as in Example 1. The charge was sealed in a container secured in a tumbling machine and was moderately agitated by the tumbling action at 60° F. for 5 days, after which time the mixture had become solid in appearance. The sodium methoxide catalyst was then deactivated as in Example 1, and the charge was then deodorized. The determination for solid triglycerides used in Example 1 showed the presence of 8% of this material whereas the mixture of oil before rearrangement under the same treatment precipitated none. The product also was found to have an iodine value of 101.8 but was higher melting than the original mixture. By subjecting the rearranged mixture of oils to the usual plasticizing processing steps, a very good plastic shortening having good consistency in a wide range of temperatures was obtained.

*Example 3.*—Refined cottonseed oil hydrogenated to an iodine value of 78 was dried. The oil was then cooled to substantially room temperature under a blanket of inert gas, with the exclusion of air, and was mixed thoroughly with the aid of a mechanical stirrer with 0.2% sodium methoxide catalyst in the form of a finely divided suspension in xylene. The oil-catalyst mixture was sealed in an air-tight glass jar which was then rotated slowly to provide continuous gentle agitation of the oil. Agitation was conducted for 18 hours in a room at 90° F., then for 24 hours in a room at 80° F., and then for 48 hours in a room at 70° F. At the end of the treatment the mixture was a thick suspension of solid crystals in liquid oil. The catalyst was then inactivated as described in Example 1, following which the fat was refined with alkali and deodorized. The following comparative values were obtained on samples of the fat before and after molecular rearrangement.

| | Before Rearrangement | After Rearrangement |
|---|---|---|
| Cloud point, ° F | 70.7 | 97.9 |
| Melting point (closed capillary tube) ° F | 94.6 | 112.8 |
| Titer of fatty acids, ° C | 33.1 | 33.1 |
| Yield of solid glycerides obtained by crystallization from 10 volumes of petroleum ether at 40° F., per cent | 0.14 | 14.3 |
| Iodine value of precipitated solid glycerides | 25.2 | 19.8 |

Samples of the fat before and after rearrangement were plasticized by passage over a chilled roll and through a picker box. After storage for 3 days, samples of the plasticized fats were brought to various temperatures, as shown below, and measured by the A. S. T. M. grease penetrometer with the following results.

| Temperature of Fat, ° F. | Penetration on Sample Before Rearrangement | Penetration on Sample After rearrangement |
|---|---|---|
| 50 | 95 | 75 |
| 60 | 127 | 101 |
| 70 | 175 | 131 |
| 80 | 277 | 155 |
| 90 | Too soft to measure | 175 |
| 100 | Completely melted | 269 |

Examination of the above penetration data will show clearly that the mixture of glycerides after rearrangement changed less in plastic consistency with change in temperature than did the same mixture before rearrangement. It will be noted, for example, that the change in penetration was less for each 10° F. change in temperature, and that the change over the range 50° F.-80° F. was 80 points (about 2.7 points per °F.) as compared with a change of 182 points (about 6.1 points per °F.) for the product prepared from the glyceride mixture before rearrangement. Moreover, at 90° F. and 100° F. the product prepared from the rearranged fat possessed a consistency that was superior to the consistency of the control sample at 80° F.

The above penetration data on hydrogenated cottonseed oil before rearrangement also confirm the widely known fact that commercial hydrogenated shortening products depart considerably from the ideal as regards change in plastic consistency with change in temperature. As a general rule such products will show a change in penetration of more than 100 points as measured on the A. S. T. M. grease penetrometer with a change in temperature from 50° F.-80° F. In accordance with the process of the present invention plastic shortening products with superior plastic consistency characteristics, changing not substantially more than 80 points in penetration over the same temperature range, can be produced from hydrogenated oil.

The improved plastic consistency in shortening products of the present invention is of value to the user not only because the product will withstand storage at higher temperatures but also because the product will be more uniform in plastic characteristics throughout ordinary temperature changes due to the weather or other influences present in the bakery or kitchen where the product may be stored or used.

*Example 4.*—Numerous attempts have been made in the past to convert winter oil stearine, the crystallized by-product separated from cottonseed oil in the production of "winter oil" or salad oil therefrom, to a suitable plastic shortening, but as far as I am aware, these attempts have met with little success because the products lack desirable plastic consistency throughout the normal range of room temperature. By the application of the present invention, a very satisfactory plastic shortening can be made and the present example is directed to such a preparation.

A mixture of 25% refined and filtered peanut oil (iodine value=87.9, titer on fatty acids=30.7° C.) and 75% refined and filtered winter oil stearine having an iodine value of 92.9, a titer on the fatty acids of 41.6° C. and containing by chemical analysis 32% saturated fatty acids having 16 or more carbon atoms, was prepared and dried. To the mixture was added 0.2% sodium methoxide in the form of a 10% suspension in xylene. Simultaneous rearrangement and crystallization was allowed to take place for 5 days at 60° F., after which the catalyst was rendered inactive by acidulation in the manner above described. The rearranged material was thereafter refined, bleached and deodorized to yield a product having by analysis an iodine value of 91.3, and a 9.6% content of substantially completely saturated triglycerides as determined by the petroleum ether method described in Example 1. The material was converted into a plastic shortening by the usual procedure of rapid chilling, etc.

*Example 5.*—A mixture of 50 parts refined and filtered coconut oil and 50 parts refined and filtered palm oil was dried and mixed with 0.5% by volume of a solution of sodium methoxide in methanol containing 0.34 gram sodium methoxide per ml. Molecular rearrangement was allowed to proceed at a series of successively lower temperatures beginning with 100° F. over a period of 10 days, the final temperature being 60° F. The rearranged product was subsequently treated with hydrochloric acid to inactivate the catalyst, washed with water, and then deodorized. Analysis indicated that the iodine value was 30.7 and that the complete melting point was 108.5° F. Whereas the mixture of palm oil and coconut oil before molecular rearrangement could not be converted into a shortening having suitable plastic consistency at ordinary room temperature, the product of the molecular rearrangement had a greater proportion of higher melting glycerides and could be plasticized to give a product of markedly improved consistency over the normal range of room temperatures. Also, as more fully pointed out below, products like the above, which result from the interesterification of a glyceride mixture containing appreciable amounts of coconut oil, show a marked improvement in foaming characteristics during deep fat frying operations.

*Example 6.*—A sample of refined and bleached soybean oil was hydrogenated at a gauge pressure of 50 pounds per square inch and at 140° C. to an iodine number of 81.3. The product had a congeal point of 23.6° C., and a capillary melting point of 100.4° F. A Twitchell analysis on the hydrogenated oil indicated a combined fatty acid content as follows:

| | Per cent |
|---|---|
| Saturated fatty acids | 22.2 |
| Isooleic acid | 9.6 |
| Oleic acid | 53.2 |
| Linoleic acid | 15.0 |

A sample of the fat was dissolved in 4 volumes of a solvent mixture consisting of 93 parts by volume of acetone and 7 parts by volume of ethanol and the solution was cooled to 70° F. to permit the insoluble solid triglycerides to precipitate. The solid fraction which precipitated amounted to 5.8% of the fat originally dissolved and had a capillary melting point of 127° F.

4500 parts by weight of the hydrogenated soybean oil were chilled to about 55° F. to induce crystallization. The oil was then warmed to 100° F. to melt the lower melting crystals. With some crystals still present at 100° F., 0.3% sodium methoxide was added in the form of a finely divided suspension in xylene. The mixture was then gently agitated in a constant temperature room at 90° F. for 16 hours, then in an 80° F. constant temperature room for 29 hours. Thereafter the charge was mixed with glacial acetic acid to inactivate the catalyst. The resulting product was refined, bleached and deodorized to give a product having a congeal point of 33.1° C. and a complete melting point of 113.8° F. The solid glycerides in the product as determined by crystallization from an acetone-ethanol solvent at 70° F. as above described amounted to 11.4% and had a capillary melting point of 138.5° F.

The rearranged oil was plasticized by passage over a chilled roll and through a picker box. With the aid of the A. S. T. M. grease penetrometer the following penetration values were obtained:

| | |
|---|---|
| 50° F. | 142 |
| 60° F. | 163 |
| 70° F. | 182 |
| 80° F. | 182 |
| 90° F. | 215 |
| 100° F. | 338 |

The hydrogenated soybean oil, before rearrangement as above indicated, was too low melting for conversion into a plastic shortening suitable for use in the normal range of room temperature. However when such oil was mixed with about 4.6% substantially completely hydrogenated cottonseed oil, the congeal point was raised to 31.2° C. This physical mixture was plasticized to give a shortening with the following penetration characteristics as determined with the A. S. T. M. grease penetrometer:

| | |
|---|---|
| 50° F. | 100 |
| 60° F. | 145 |
| 70° F. | 187 |
| 80° F. | 206 |
| 90° F. | 239 |
| 100° F. | 321 |

Comparison of the above penetration data will show that the plasticity of the product produced in accordance with my invention changed less with change in temperature from 50° to 80° F. (only 40 points) and that in general it was more plastic at the lower temperatures without being more soft at the higher temperatures.

As a generalization, similar plastic shortening products having suitable working plasticity with not substantially more than 80 points change in penetration from 50° F. to 80° F. may be produced in accordance with my invention from fats consisting predominantly of temperate zone seed oils of the group consisting of cottonseed, soybean, peanut, sunflower seed, sesame, and corn.

At this point I desire to point out more fully how the product of Example 6 and similar plastic shortening products of my invention, which may be produced from vegetable oils of the above group, hydrogenated to iodine values as low as 75, differentiate over known commercial plastic shortenings. An explanation of terms hereinafter frequently used to describe and claim such products also appears in order. An "all-hydrogenated" oil or shortening is one in which all of the fatty constituents have been subjected to a hydrogenation procedure. The term "partially hydrogenated" is used to designate an all-hydrogenated fatty material whose degree of unsaturation has been only partially reduced by the hydrogenation (e. g. iodine values not substantially lower than 75). "Substantially completely hydrogenated" is used to designate all-hydrogenated products which for practical purposes have been hydrogenated to substantially the maximum degree of saturation.

As indicated in Example 3, commercial shortening products produced from partially hydrogenated oils depart considerably from the ideal as regards change in plastic consistency with change in temperature. This is due to the nature of the glycerides produced on hydrogenation. However, such hydrogenation, when applied to the whole oil, reduces the overall degree of unsaturation thereof and accordingly such all-hydrogenated products have improved natural stability as regards the development of rancidity due to oxidation, that is, they have a natural stability (i. e. without the use of an added antioxidant) of more than 40 hours, the stability figures referred to here and elsewhere in the application being determined in accordance with the procedure of King, Roschen, and Irwin, described in "Oil and Soap," volume 10, pages 105–109 (1933) with details modified as shown in "Oil and Soap," volume 22, pages 101–104 (1945).

On the other hand, the blended type of plastic shortening, sometimes referred to as "compound," prepared by plasticizing a mixture of unhydrogenated liquid oil and a substantially completely hydrogenated oil has very good resistance toward change in plasticity with change in temperature, but suffers the disadvantage of having a low natural stability against the development of rancidity, that is, ordinarily not substantially more than 25 hours.

With the aid of the instant invention the arrangement of the fatty acid radicals in the glyceride molecules of the partially hydrogenated oil is modified so as to concentrate the higher melting combined fatty acids into one group of triglycerides, and the lower melting combined fatty acids into another group of triglycerides. The result is a glyceride composition which can be converted into an all-hydrogenated plastic product having not only the desirable natural keeping quality characteristics of present day all-hydrogenated type of shortening, but also the desirable plastic consistency characteristics of the blended type of shortening. For example, the invention may be practiced on partially hydrogenated oils here under consideration so as to produce, as above indicated, a glyceride composition which can be converted into a plastic shortening product showing not substantially more than 80 points change in A. S. T. M. penetration with change in temperature from 50 to 80° F. and having a natural stability as regards rancidity development of at least 40 hours.

*Example 7.*—Refined and bleached cottonseed oil was hydrogenated at substantially atmospheric pressure and at about 165° C. to yield a product having an iodine number of 78.3, a congeal point of 22.3 and a complete capillary melting point of 94.3° F. No solid triglycerides separated from a solution of the fat in 4 volumes of the 93:7 acetone: ethanol solvent mixture at 70° F. The combined fatty acids analyzed as follows by the Twitchell analysis.

| | |
|---|---|
| Saturated fatty acids | 24.5 |
| Isooleic acids | 11.5 |
| Oleic acid | 47.8 |
| Linoleic acid | 16.2 |

To the hydrogenated oil at about 120° F. was added 0.3% sodium methoxide in the form of a finely divided suspension in xylene, the mixture was stirred for about 30 minutes and was then chilled to about 57° F. at which temperature a heavy cloud was perceptible in the oil. This mixture was then gently agitated at 90° F. for about 66 hours. Thereafter the catalyst was inactivated by the addition of glacial acetic acid and the resulting oil was refined, bleached and deodorized. The solid triglycerides in the product as determined by crystallization from 4 volumes of a 93:7 acetone: ethanol solvent at 70° F. amounted to 8.8% and had a capillary melting point of 131.9%.

To 97.75 parts rearranged oil were added 2.25 parts of substantially completely hydrogenated soybean oil. This mixture had a congeal point of 32.6° C. and, by the acetone-ethanol solvent crystallization method at 70° F., yielded 13.9% of a solid fraction having a melting point of 132.3° F. The mixture of fats was plasticized as in Example A to yield a product with the following penetration values as determined with the aid of the A. S. T. M. grease penetrometer:

| | |
|---|---|
| 50° F | 120 |
| 60° F | 152 |
| 70° F | 173 |
| 80° F | 181 |
| 90° F | 252 |

Similar improvement in the plastic range of various other fats, including partially hydrogenated vegetable oils, which are too soft to be converted directly into a high quality plastic fat, may be effected to a degree depending on the characteristics and composition of the fat before rearrangement.

In accordance with another feature of my process as applied to plastic fat products, some of the fats or fat mixtures which are suitable for use in my invention, especially those containing more than 20 per cent of saturated fatty acid having at least sixteen carbon atoms combined as glycerides such as the various grades of tallow, palm oil, hydrogenated vegetable oils such as cottonseed oil, soybean oil, corn oil, etc., and marine oils, and hydrogenated marine oils and various mixtures thereof, may be processed by subjecting fat or mixture of fats to catalytic molecular rearrangement at a temperature sufficiently low that solid triglycerides formed in the rearrangement precipitate as a solid phase, allowing the rearrangement to progress until a substantial proportion of solid triglycerides has been formed and precipitated and until the rearranged fat contains a larger proportion of solid triglyceride than is necessary to give desirable firmness in a plastic fat, and then adjusting the content of solid triglycerides to be used in the shortening to a proportion which is smaller than the amount contained in the rearranged fat, usually not substantially more than 20 per cent, but to a proportion sufficient to impart desirable firmness to the mixture in the range of normal room temperature. The inclusion of the step of adjusting the proportion of solid glycerides in the rearranged mixture to a suitable amount by admixture with a glyceride oil, liquid in the range of ordinary room temperature, or by removal of some of the solid triglyceride as by fractional crystallization, or by removal of more than enough solid triglyceride followed by readjustment in solid triglyceride content is a variant over the processing set forth in Examples 1 to 7. Thereafter the fat may be plasticized in any suitable manner to give a plastic product of good consistency over a wide range of temperature In Examples 8 to 12 inclusive which follow, that phase of the invention dealing with the adjustment of the solid triglyceride content of the rearranged fat by admixture with liquid glyceride oil is shown, and in Examples 13 and 14 the process of fractional crystallization followed by filtration or pressing and readjustment, if necessary, is set forth.

*Example 8.*—To 100 parts of refined, bleached and deodorized tallow at 120° F. were added 0.2 part of sodium methoxide in the form of a 10% suspension in xylene; the mixture was mechanically agitated for ½ hour at this temperature and was then chilled with simultaneous stirring until precipitated solid glycerides formed a slight cloud in the oil. Thereafter the mix was stored for successive periods of 24 hours each at 100°, 90°, 80° and 70° F., and for a further period of 5 days at 60° F. The sodium methoxide catalyst was then rendered inactive with 5 parts of phosphoric acid in the presence of ice in a high speed agitator adapted to break the rearranged fat into small particle form.

Analyses on the original and rearranged tallow indicated that the melting point by the closed capillary tube method was raised from 114.3° F. to 126.4° F. by the rearrangement process, whereas the iodine value was substantially unchanged. By the petroleum ether method of determination at 50° F. the original untreated tallow precipitated 9.3% of solid triglycerides having by analysis an iodine value of 6.4 and a melting point of 135.9, whereas the rearranged tallow precipitated 36.7% of solid triglycerides having an iodine value of 5.2 and a melting point of 136.0° F.

This rearranged product was too high in melting point for direct conversion into a satisfactory plastic fat, but a mixture of one part thereof, deodorized, with 3 parts refined, filtered and deodorized cottonseed oil gave a glyceride composition which yielded about 9% substantially completely saturated triglycerides on crystallization from petroleum ether at 50° F. and which was readily converted into a plastic shortening having good consistency at temperatures in the range of normal room temperatures by passage over a chilled roll and through a picker box arrangement.

*Example 9.*—100 parts of refined, bleached and deodorized palm oil having by analysis a melting point of 105° F. by the closed capillary tube method, an iodine value of 54.7 and a cloud point of about 74° F., were held at 70° F. until a substantial amount of solid triglycerides had precipitated. The mass was then heated to 100° F. without melting all of the precipitated material and mechanically agitated for 30 minutes at this temperature with 0.2 part sodium methoxide as a 10% suspension in xylene. For 24 hours thereafter the mixture was held at 100° F. and rearrangement and simultaneous crystallization of the solid triglycerides permitted to take place. At the end of the reaction period the catalyst was suitably decomposed by treatment with hydrochloric acid, and the rearranged palm oil was deodorized. By petroleum ether method of determination at 50° F., the rearranged fat contained about 26.6% solid triglycerides having an iodine value of 2.3 as compared with about 6% having an iodine value of about 7 for the original untreated palm oil.

To 24 parts of this rearranged palm oil were added 76 parts of refined and bleached and deodorized cottonseed oil hydrogenated to an iodine value of about 83. This mixture was plasticized in the usual manner to yield a shortening product which had good consistency and plasticity over the range of normal room temperatures.

*Example 10.*—A sample of the same palm oil employed in Example 9 was held for 20 hours at 70° F., to permit the precipitation of solid triglycerides, then warmed to 100° F., without completely melting all thereof. At this temperature 0.12% sodium methoxide catalyst in the form of a 10% suspension in xylene was added to the oil and mechanically agitated therewith for 15 minutes. This material was held at 100° F., for 24 hours, and then at 80° for 72 hours. After acidulation, washing, and deodorization the product showed on analysis a melting point of 133.5° F., and by the petroleum ether method of determination a content of 36.3% solid triglycerides having an iodine value of 1.6.

To 36.9 parts of this product were added 63.1 parts of refined, bleached and deodorized cottonseed oil, thereby forming a mixture having about 13.5% substantially completely saturated triglycerides as determined by the petroleum ether method at 40° F. This mixture was subsequently plasticized by passage over a chilled roll and through a picker box arrangement to yield a shortening product which was entirely suitable for use at temperatures in the range of normal room temperatures.

Example 11.—A mixture was prepared of 1 part refined, bleached and deodorized peanut oil showing by test an iodine value of 92.6 and 3 parts of deodorized winter oil stearine removed from cottonseed oil in the manufacture of a salad oil and having an iodine value of 89.3, and, by analytical determination, a combined saturated fatty acid content of about 32%. In this mixture was incorporated 0.2% sodium methoxide in the form of a 10% suspension in xylene. Rearrangement was permitted to take place at 70° F., for a period of 5 days after which the catalyst was rendered inactive by treatment of the reaction mix with hydrochloric acid followed by water washing. The product was refined with caustic soda solution to remove residual free fatty acids, then bleached and deodorized. The resulting glyceride mixture had an iodine value of 91.2 and a 17% content of solid triglycerides of 2.8 iodine value as determined by crystallization from petroleum ether at 40° F.

A mixture of 37.6% of this material and 62.4% of refined, filtered and deodorized cottonseed oil showed on analysis an iodine value of 102.5 and a content of 6% substantially completely saturated triglycerides by the petroleum ether method at 40° F. This mixture was readily converted by plasticizing into a plastic shortening having good consistency in the range of normal room temperature and good properties for cake making.

Example 12.—A mixture of 98 parts refined, filtered and deodorized cottonseed oil and 2 parts substantially completely hydrogenated sardine oil having an iodine value of about 8 was prepared and mixed with 0.2% sodium methoxide in the form of a 10% suspension in xylene. Molecular rearrangement was allowed to proceed for 8 days at 70° F., after which the catalyst was deactivated as usual and the oil washed, refined and deodorized. By the petroleum ether method of determination, the oil contained about 14.4% substantially completely saturated triglycerides, but these triglycerides possessed an unusually strong stiffening action, and because of this the fat could not be converted directly by plasticizing into a shortening of the most desirable consistency.

However, a mixture of 61% of this product with 39% filtered and deodorized cottonseed oil was less firm, showing by the petroleum ether method of analysis 8% substantially completely saturated triglycerides, and was transformed in the customary manner into a plastic shortening which had good consistency in the range of normal room temperatures and good working properties, especially for cake making.

In Examples 8 to 12, other oils such as peanut oil, corn oil, soybean oil, as well as partially hydrogenated oils, which are liquid or substantially so in the range of normal room temperatures may be substituted for the cottonseed oil and admixed with the rearranged fat to obtain a product having a solid triglyceride content such that the fat after plasticizing will have desirable consistency.

Example 13.—To 9000 parts of refined and filtered palm oil having a closed capillary tube melting point of about 110° F., and an iodine value of 52.7 were added 53 parts of a 26.6% solution of sodium methoxide in methanol. The addition was made at a temperature of 110° F., and the mixture was mechanically agitated at this temperature for 15 minutes in order to distribute the catalyst uniformly throughout. The container was closed and stored at 100° F. After 3 hours and after 5 hours, the container was shaken and the contents thereby agitated. After 21 hours at 100° F., the contents were substantially solid in appearance but contained liquid glycerides enmeshed in the crystals of the precipitated solid glycerides. Thereafter rearrangement was permitted to take place at 90° F., for 24 hours and then at 80° F., for 96 hours. The catalyst was inactivated by the addition of 400 parts 10% phosphoric acid which was distributed throughout the fat mixture as uniformly as possible with the aid of a heated knife. A mechanical agitator was used to mix the acid with the fat as soon as it became melted. The fat was then heated to 180° F., settled, decanted, washed and filtered. A sample of this material, when subjected to the petroleum ether method for the determination of solid triglycerides, gave 32.6% of a solid fraction with an iodine value of 0.8 and melting point of 142° F. The melting point of the highest melting form of tripalmitin is stated to be 150° F. in an article in the Journal of the Chemical Society, 1934, page 669.

The rearranged fat was stored at 110 to 115° F. for 94 hours, after which time a considerable amount of crystallization of solid glycerides had taken place and the mixture had become semi-solid. The final temperature of crystallization was 113° F. The crystallized fraction was then separated from the liquid fraction by suction filtration to yield 47% solids with an iodine value 32.7, and 53% liquid with an iodine value of 71. The liquid fraction was found to contain about 8% substantially completely saturated triglycerides by the petroleum ether method and after refining, bleaching and deodorizing was plasticized to yield a plastic shortening with good consistency characteristics in the range of normal room temperature.

Instead of conducting the process of this example in accordance with the low temperature molecular rearrangement process of my application Serial 562,062, it may be found desirable to proceed according to my application Serial No. 516,705, filed January 1, 1944, wherein interesterification may be conducted at temperatures at which the glycerides are wholly liquid and wherein the desired constitution of the final product is effected in a series of steps involving fractional crystallization, separation of liquid and solid fractions, and recycling at least one of the fractions. For example, the palm oil could be rearranged wholly in the liquid phase, then, by fractional crystallization, separated into a high melting solid fraction and a lower melting liquid fraction. The liquid fraction is subjected to further fractional crystallization and separated into solid and liquid fractions. The solid fraction of this second separation may be recycled in the process as more fully set forth in Serial No. 516,705 and the liquid fraction may be combined with a portion of the high melting solid fraction of the first separation to give a mixture of glycerides having characteristics desirable in a fat which is to be converted into a shortening with good plastic consistency in the range of normal room temperatures. I do not wish to imply, however, that the recycling operation cannot be combined with the low temperature molecular rearrangement procedure. Such combination may be made if desired.

*Example 14.*—A sample of tallow having a cloud point of 32.6 and a closed tube capillary melting point of 115.2° F. was mixed with 0.3% sodium methoxide as a 10% suspension in xylene for 30 minutes at 120° F., then chilled at 50° F. until crystallization had begun. Thereafter the mixture was stored for 2 weeks at 90° F. and molecular rearrangement permitted to take place. The catalyst was then inactivated with the use of phosphoric acid, and the rearranged fat was subsequently washed and filtered in the usual manner. The mixture was then dissolved in a 10-fold volume of petroleum ether and cooled to 50° F. to crystallize the solid triglycerides. After 24 hours at 50° F., the solid triglycerides were separated from the petroleum ether solution by filtration. The solvent was removed by evaporation. The solid triglycerides amounted to 29.5% of the rearranged fat and was found to have an iodine value of 4.2 and a melting point of 136.0° F. The liquid fraction was found to have an iodine value of 63.0. This liquid fraction contained substantially no saturated triglycerides and was not suitable for use as a plastic shortening because of its inability to withstand high temperature. However, such products as this liquid fraction are very well suited as base stocks for plastic shortenings, and a mixture of 87.5 parts of same with 12.5 parts of the 4.2 iodine value solid fraction, which was removed in solvent crystallization, yielded a mixture which could be plasticized and converted into a suitable plastic shortening.

In Examples 13 and 14, the rearranged fat, having more than the necessary amount of solid triglycerides for suitable plasticity and consistency, may be subjected to any suitable process whereby the excess solid triglyceride is removed to yield a product easily plasticized to a suitable shortening as above shown. It should be understood that fractional crystallization followed by filtering, filter pressing, or centrifuging is not the only method by which the excess solid triglycerides may be removed. Preferential extraction with the use of furfural, for example, or the crystallization from a solvent may be employed also.

In some cases it may be desirable to carry out the simultaneous interesterification and crystallization process itself in the presence of a solvent. It has been found that this can be done in the presence of various solvents, especially non-polar materials of this class such as hexane, heptane, benzene, etc., provided that suitable adjustments in the temperatures used are made. For example, in cases where a separation of solid from liquid fractions is to be made at the end of the interesterification process, as in Examples 13 and 14, the solvent may be added at the beginning of the interesterification, and with suitable lowering of the temperatures to compensate for the presence of the solvent substantially the same changes in composition of the fats being treated may be effected. The handling of the fats during the process and the mixing with reagents to inactivate the catalyst at the end of interesterification may be facilitated by the presence of solvent.

Separation of the saturated triglycerides as shown in Example 14 may also be accomplished by crystallization of the rearranged fat at relatively high temperatures such as 110 to 120° F. without the use of a solvent, but it should be pointed out that in employing the processes of my invention involving the separation of solid triglycerides by crystallization procedures, the characteristics of the plasticized product will depend in a large part on the final temperature to which the fat is subjected during crystallization. High temperatures appear to effect the removal of only the very high melting saturated triglycerides, whereas crystallization at lower temperatures will remove not only some of the lower melting saturated triglycerides but also, if sufficiently low certain disaturated mono-unsaturated triglycerides as well.

The processing as set forth in Examples 13 and 14 is particularly applicable for fats and fat mixtures which contain more than about 35 per cent of saturated acids having 16 or more carbon atoms. For example, palm oil and tallow are fats which may be treated by this process with good results. On such fats the temperature at some time during rearrangement should be as low as 110° F. or lower. Specifically, the final rearrangement temperature may be 100° F. with good results but, of course, temperatures as low as 70° F. are permissible. It should be borne in mind, however, that at a final temperature of 70° F. there would be a larger percentage of solid glyceride than at 100° F. when the reactions are carried to completion and, therefore, more of the solid triglycerides would have to be removed or otherwise balanced with softer fat in order to obtain a given consistency at average temperatures of use.

It may be more economical to make plasticized shortening, for example, from 100 per cent palm oil employing the separated excess solid triglycerides as a fat for use in soap making, rather than admix the palm oil with a softer fat such as cottonseed oil. Palm oil, which has been used to a considerable extent in my work, contains mainly in combined form palmitic, oleic, myristic, stearic, and linoleic acids, the palmitic and oleic acids predominating in amount. For example, in various samples of palm oil the amount of palmitic acid will vary from 32.3 per cent to 45.1 per cent and the amount of oleic acid will vary from 52.4 per cent to 38.6 per cent. (See Table VI of article "The Composition of Commercial Palm Oil," Hilditch and Maddison, J. Soc. Chem. Ind. 59, pages 67–71, 1940.) Although the fatty acids of the palm oil are combined by nature mainly as mixed saturated-unsaturated triglycerides (ibid.), the application of the process of molecular rearrangement herein used, as previously stated, will effect an increase in the content of completely saturated and completely unsaturated triglycerides in the oil with a corresponding decrease in the content of mixed saturated-unsaturated triglycerides and will therefore convert the palm oil to a mixture of triglycerides containing a large proportion of the palmitic acid combined as tripalmitin and a large proportion of the oleic acid combined as triolein.

Not all of the numerous ways of applying low temperature molecular rearrangement to plastic fat production are described above, and additional variations may be employed to give products having improved characteristics and enhanced value.

Thus by the employment of my rearrangement process, it is possible to modify low price fats that are too hard or too soft, or that are too soft when warm or too hard when cool, and to utilize the resulting products in the manufacture of good plastic shortenings. Some of the examples previously described illustrate processes which embody the treatment of fatty materials not otherwise suitably adapted for conversion without modification into a good plastic shortening.

It will also be observed from some of the preceding examples that various fats can be readily converted into suitable plastic products without the use of a hydrogenation step in the process. Products prepared with the use of oils containing appreciable amounts of linoleic acid glycerides such as cottonseed oil, soybean oil, peanut oil, and the like, and mixtures containing the same, will of course contain appreciable amounts of such glycerides and may be preferred by those who desire a shortening so constituted. In this connection, for example, winter oil stearine may be rearranged at a final temperature of 70 to 80° F. and then mixed with soybean oil to give an unhydrogenated product having a good plastic range with high content of natural glycerides of linoleic acid.

Aside from the advantages such unhydrogenated products have in their greater resistance to change in plasticity with change in temperature, there is an outstanding advantage in simplicity of equipment required for their production. Elimination of hydrogen gas generators, purifiers, and oil hydrogenation equipment, together with auxiliaries, involves a saving in operation and equipment costs which is appreciable.

Omission of the hydrogenation step in the treatment of oils preparatory to conversion into a shortening product also has value in that the natural vitamin content of an oil is not appreciably destroyed or rendered inactive, provided of course other processing steps such as deoderization are conducted under conditions, especially temperature conditions, which do not adversely affect the vitamin constituent. Thus in the present process one finds a method available for employing to advantage oils such as palm oil normally having a high content of pro-vitamin A which can be conserved to a large extent.

In connection with the preparation of plastic products by interesterification of fats or mixtures thereof which have not been hydrogenated and which have a content of combined saturated fatty acid sufficiently high when existing as substantially completely saturated triglycerides for imparting desirable plastic consistency to plastic shortening products made therefrom, I desire to point out that application of the interesterification process so as to convert the glyceride mixture into one predominantly consisting of tri-saturated glycerides and tri-unsaturated glycerides will result in products whose trisaturated glycerides contain the saturated fatty acids in combined form in substantially the same relative proportion as the fat prior to interesterification. In those fats ordinarily employed in shortening manufacture, that is cottonseed oil, palm oil, peanut oil, soybean oil, sesame oil and the like, the combined saturated fatty acids consist predominantly of palmitic acid. Consequently the high melting trisaturated glyceride fraction which is formed in the low temperature interesterification and which will exist in the plastic shortenings made from the fat will consist predominantly of combined palmitic acids. This feature distinguishes the products of the present invention over present day commercial shortenings whose plastic stability at the higher temperatures is due to the presence of a saturated triglyceride fraction which consists predominantly of combined stearic acid resulting either from hydrogenation of the whole fat or from the addition of a substantially completely hydrogenated fat. This difference in the constitution of the fat in products produced in accordance with the present invention is a useful difference in kind since the presence of a predominant proportion of combined palmitic acid, which melts at a lower temperature than stearic acid and which is more soluble in fatty media, contributes to greater absorption and utilization or digestibility of the fat on internal consumption, an outstanding and desirable characteristic.

By proper choice of fats with which to work and by suitable choice of conditions of molecular rearrangement it is also possible to produce plastic fats whose consistency is improved with respect to texture, stability with age, and plastic range, that is, less change in consistency with change in temperature. For example, plastic shortenings having improved plastic range may be prepared by plasticizing a mixture of rearranged palm oil and a more unsaturated oil as disclosed in Examples 9 and 10. Soybean oil is an especially attractive possibility in this connection since it has a low content of intermediate melting glyceride.

It is also possible to employ the present process in the production of a product which has improved keeping quality with regard to deterioration due to oxidation. For example, such an improved product may be made by rearranging cottonseed oil with a stepwise reduction of temperature during rearrangement to about 50° to 60° F., thereby accumulating a large proportion of the saturated acids in a fully saturated glyceride fraction, then inactivating the catalyst, separating the saturated glyceride from the more unsaturated glyceride constituents, and hydrogenating the unsaturated constituents to produce a mixture of glycerides suitable for conversion into a plastic shortening having good stability against the development of rancidity due to oxidation.

Suitable control of conditions and choice of materials will occur to those versed in the art to give special advantageous characteristics in the plastic fat as regards improved smoothness, whiteness, as well as improved properties making the products especially valuable for the preparation of pastry, such properties including shortening value, creaming volume, ease of creaming, workability, etc.

For those plastic fats which are designed for general use, including deep fat frying, it is especially desirable to have a product which not only has plastic properties but also has a relatively low degree of unsaturation so as to reduce to a minimum deterioration of the fat due to oxidation and decomposition during heating. In this connection, prior investigators have recognized the value of coconut oil in shortening used in deep fat frying, but physical mixtures have not met with much success primarily because of an undesirable tendency on the part of the fat to foam at high temperature in carrying out this operation. The present process provides means whereby glyceride mixtures containing appreciable amounts of coconut oil may be subjected to molecular rearrangement at low temperature to yield products with marked reduced tendency to foam in deep fat frying.

Another method for preparing a shortening product containing a large proportion of coconut oil and having distinctive characteristics includes subjecting palm oil to molecular rearrangement with simultaneous crystallization at a final temperature around 90° F. and then, without separating the solid triglycerides crystallized or without inactivating the catalyst, mixing with the rearranged mixture, liquid coconut oil and permitting an ester interchange to take place between the coconut oil and the liquid constituent of the rearranged palm oil at the same or lower temperature. Of course, other oils than palm oil, such as cottonseed oil, etc., may be employed in a process of this nature to give special characteristics. In thus adding a liquid oil after molecular rearrangement of a fat has been effected at low temperature and before inactivation of the catalyst, it should be borne in mind that equilibrium conditions between the solid and liquid constituents may be disturbed and that prompt inactivation of the highly active catalyst may be desirable to stop the rearrangement with the coconut oil before a substantial amount of the crystallized constituent of the palm oil or other oil can be dissolved and thereby made available for engagement in the interesterification reaction.

The discussion and examples already given will enable those skilled in the art and technology of edible fat production to understand how the process of simultaneous interesterificaton and crystallization may be used to improve the adaptability of various fats and oils to specific uses and how this process may be combined with conventional processing procedures such as hydrogenation, graining (fractional crystallization), hydraulic pressing, blending, etc., to good advantage in the utilization of various fats. The possibilities for such combinations are too numerous to be discussed in detail, but a few such possibilities of special importance may be mentioned.

Mixing of fat stocks may be advantageous, in some cases before the interesterification, in other cases after the process has been applied to one or more of the fats constituting the final mixture. Mixtures may be part animal fat and part vegetable fat and may be part hydrogenated fat and part unhydrogenated fat. Also synthetic glycerides such as triacetin and tributyrin may constitute part of the mixture subjected to the rearrangement process.

Fractionation of stocks may be used in conjunction with the interesterification process, as when winter oil stearine obtained as a by-product of the production of salad oil is improved for use in shortening. This improved use of the winter oil stearine by means of the interesterification process makes it possible to improve the quality of salad oil without affecting its price materially since an outlet for an increase yield of winter oil stearine in high quality products allows cottonseed oil, etc. to be economically grained to give winter oil which will withstand lower temperatures without the formation of a cloud.

Fractionation after interesterification also may be employed in the production of salad oil, as when an oil is subjected to the interesterification process to accumulate most of the saturated acids of the oil into a high melting fraction and after inactivation of the catalyst, thereafter is grained and filtered at a temperature sufficiently low, for example 40° F. or lower, to give a liquid fraction having resistance toward the development of a cloud at low temperature and other properties suitable for salad oil. Improved yields of low cloud point oil are obtainable in such cases.

Hydrogenation may be used in various ways in conjunction with interesterification and with the procedures mentioned above. Thus the interesterification process may be applied to hydrogenated fats, unhydrogenated fats, or mixtures of hydragenated and unhydrogenated fats as a step in the production of plastic fats. Moreover hydrogenation may be applied after interesterification.

In connection with the use of the present invention in conjunction with hydrogenation procedures, a fact of importance is that the conditions of hydrogenation, including temperature, pressure of hydrogenation, catalyst, etc., determine to a considerable degree the properties of the hydrogenated product including the concentration of glycerides containing combined isooleic acid. Since isooleic acid is comparatively high melting, although unsaturated, fat hydrogenated to a given iodine value under two different sets of conditions chosen to give respectively a high and a low ratio of isooleic to saturated fatty acid will behave somewhat differently in the process of this invention. Thus special combinations of hydrogenation conditions and interesterification conditions may be used to produce special effects.

For example, soybean oil hydrogenated to an iodine value of about 79 and a capillary melting point around 92° F. under conditions selected to produce relatively little increase in the combined saturated acid content of the oil but a substantial proportion of combined isooleic acids, (e. g. hydrogenation with the use of a catalyst of low activity at high temperature and for a long time) was found to produce an excellent fat for production of margarine when subjected to the interesterification process for a few hours at 60° F. The interesterification was carried out in this case at a temperature substantially below the complete melting point of the fat, with the result that the crystallization of a solid fraction during interesterification was rapid, and also that the solids crystallized during interesterification were not the highest melting that could be formed from the fat if interesterification had been started at a high temperature. The resulting products of 6 to 24 hours interesterification at 60° F. had melting points around 97 to 102° F., not very much higher than before interesterification had been effected. In comparison with the original hydrogenated stock they possessed a firmer consistency at 70° F. to 90° F. and a softer consistency at 50° F. and lower. These characteristics of melting completely at temperatures not substantially higher than body temperature and of having good consistency at ordinary room temperature and at ordinary refrigerator temperatures make this rearranged stock excellent for production of margarines with superior spreading qualities at 50° F. but with penetrations at 70° F. not substantially over 150 as measured with the A. S. T. M. grease penetrometer.

A fat stock with a lower iodine number hydrogenated under similar conditions and rearranged under conditions similar to those just mentioned was found to produce a product giving good results when used as a shortening for the preparation of puff pastry.

For the production of general purpose plastic shortening on the other hand, where a higher melting point is permissible and a wide plastic range is desirable, a higher final temperature for the interestification may be used advantageously, especially when the stock to be treated has been hydrogenated under conditions (low temperature and short time) that keep the proportion of isooleic acid low. Soybean oil hydrogenated under 100 pounds gauge pressure at 125° C. to an iodine value of 79 had a final melting point of 103° F. but was too soft at temperatures above 70° F. to be used as a shortening. Rearrangement of this stock at temperatures gradually reduced from 100° F. to 90° F. resulted in a product with a melting point of 117° F. which when plasticized gave a shortening having unusually small change in consistency as the temperature was varied over the range 50° F. and 100° F. together with good stability of consistency.

Similarly a plastic shortening having wide plastic range and exceptional stability of consistency may be prepared by first hydrogenating cottonseed oil at 100 pounds pressure and 125° C. to 78 iodine value. The resulting product is subjected to interesterification with stepwise reduction of temperature from 90 to 70° F. in the presence of a catalyst active at low temperature. The catalyst is inactivated in the customary manner, and the filtered and deodorized product is converted into plastic shortening of the all-hydrogenated type. The same type of a process can be applied of course to other oils than cottonseed oil, such as soybean oil, rapeseed oil, peanut oil, corn oil, olive oil and the like.

Another all-hydrogenated shortening having improved qualities with regard to plasticity over a wide range of temperature may be prepared from cottonseed oil by rearranging to a final temperature of 70° F. in the presence of a low temperature molecular rearrangement catalyst, inactivating the catalyst, then hydrogenating the rearranged product to about 80 iodine value and converting the hydrogenated material, after deodorization, to plastic form. A similar process may be applied to the treatment of soybean oil, of course with modification in temperature of rearrangement and end point of hydrogenation.

In connection with that feature of my process in which interesterification is combined with hydrogenation in the preparation of edible plastic shortenings, it is to be understood that by selection of fats in which the content of combined palmitic acid predominates over the content of other saturated fatty acids by a substantial margin (e. g. cottonseed oil, sesame oil, soybean oil, peanut oil and the like) and with the use of known selective hydrogenation conditions which will hydrogenate the linolic acid radicals to oleic acid radicals without hydrogenating more than a relatively small proportion of oleic acid radicals to stearic acid radicals, products are obtained which are characterized not only by a change in plastic consistency of not substantially more than 80 points (A. S. T. M.) penetration with change in temperature from 50° F. to 80° F. but also by their improved digestibility coincident with a content of saturated triglyceride constituted predominantly of combined palmitic acid as referred to more fully above.

The use of tallow in the preparation of plastic shortenings has not been adopted to any great extent because the products obtained do not have the consistency characteristics desired in the type of product herein concerned. In accordance with the present invention, a shortening with very good plastic range may be made at low cost by rearranging tallow at a final temperature of 80° F. under conditions to produce about 32 to 34 per cent fully saturated high melting glycerides, and then mixing 40 to 50 parts of the product with 60 to 50 parts of soybean oil.

Lard is a natural shortening product, but it does not have the desirable plastic range and consistency of vegetable oil shortenings. Use of the present simultaneous interesterification and crystallization process in the treatment thereof will result in an increase in melting point and therefore an improved consistency at the higher temperatures. In addition, undesirable characteristics of lard may be improved by rearranging the lard and then mixing the same with cottonseed oil, soybean oil and the like, or by rearranging a mixture of the lard with such vegetable oils.

In the illustrations given above, the product resulting from low temperature interesterification is wholly used or is used as a large proportion of the finished shortening or fat product, but it is also within the scope of the invention to prepare by the process herein covered special hard stocks which may be used in small proportion to be added to shortening base stocks. Thus, for example, a special hard stock for use with cottonseed oil in the manufacture of a shortening product having distinctive qualities and texture, temperature range of plasticity, and ability to form aerated batters may be prepared by subjecting an unhydrogenated sardine oil to rearrangement with simultaneous crystallization of solid glycerides and then after inactivating the catalyst hydrogenating the rearranged fat to a low iodine number. Special hard stocks can be made from various other fats such as winter oil stearine, peanut oil, palm oil, whale oil, rapeseed oil and other oils, or from mixtures by interesterification before or after hydrogenation.

The invention as applied to the preparation of plastic fats is not limited to any particular manner of converting the fat mixture to the desired plastic form. Any of the ordinary methods employed for this purpose in the industry are satisfactory, the most common method being passage of the fat mixture over a chilled roll and through a picker box arrangement and passage through a processing apparatus such as is disclosed in Reissue Patent 21,406 issued to Clarence W. Vogt.

Since the stiffening power of certain solid triglycerides formed in the molecular rearrangement with simultaneous crystallization of some oils as herein described is much greater than that obtained in the treatment of other oils, the substantially completely saturated triglyceride content to which final adjustment should be made is not easily defined. For example, straight cottonseed oil rearranged so as to produce about 13 per cent saturated triglyceride, as in Example 1, is somewhat softer than the rearranged mixture of peanut oil and cottonseed oil of Example 2 and containing about 8 per cent saturated triglycerides. Melting point and congeal point determinations on the treated fats or fat mixtures are likewise insufficient in providing an easy means by which the consistency of the final plastic product can be predicted. My experience, gained in many applications of my process, has led me to the conclusion that the amount of saturated triglyceride desirable in a fat mixture of an ultimate product of satisfactory plasticity and consistency at temperatures in the normal range of room temperatures will in most cases be from about 5 per cent to about 20 per cent in which the major portion of the fatty acids contains 16 or more carbon atoms, the exact amount being dependent on the stiffening power of the particular saturated triglycerides present. I do not, however, confine myself strictly to this range because any combined isooleic acid (an unsaturated fatty acid with a melting point of about 42° C. to 45° C.) present in the fat, due for example to hydrogenation, may exert a stiffening action and thereby alter the amount of saturated triglycerides necessary for desirable consistency.

Since various glyceride oils and fats which may be subjected to the process may contain 15 per cent and above of saturated fatty acids of at least 16 carbon atoms, the rearrangement temperatures required to produce a rearranged product which may be converted into a plastic fat of good consistency by plasticizing will vary. If the proportion of saturated fatty acid present in the fat is small, then the temperature of rearrangement with simultaneous crystallization must necessarily be lower than if the proportion of solid fatty acid were high. Otherwise, an insufficient quantity of solid glyceride may be produced. There is a more or less general relationship between the per cent of saturated fatty acid having 16 or more carbon atoms in the fat and the final temperature at which molecular rearrangement and simultaneous crystallization is conducted. As a guide in practicing the invention, the following table of temperature conditions will be helpful, but it is to be understood that these conditions may be varied without departing from the spirit of the invention and that I am not strictly limited thereto.

| Per Cent Saturated Fatty Acid Having 16 or More Carbon Atoms in the Fat | Final Temperature of Rearrangement |
| --- | --- |
| 50 | 110° F. or lower. |
| 35 | 100° F. or lower. |
| 25 | 90° F. or lower. |
| 20 | 80° F. or lower. |
| 17½ | 70° F. or lower. |
| 15 | 50° F. or lower. |

Control of the quantity of high melting glycerides formed in rearrangement is obtained by controlling the final temperature, or by interrupting the rearrangement before the maximum quantity of high melting glyceride is formed. Fats which contain more saturated combined fatty acid will, of course, tend to precipitate more solid glyceride at a given temperature of rearrangement.

Another branch of the edible fat industry in which application of the low temperature molecular rearrangement may be made is that branch dealing with the production of confectioners' hard butters which are employed in a large amount in the manufacture of candy and cookie coatings, icings, and fillings for candies, cookies and other confections, and as the fat ingredient in caramels.

In candy manufacture, cocoa butter has long been employed as the natural occurring confectioners' hard butter. However, there exist on the market many products which are prepared from other fats and oils, particularly vegetable oils derived from a group of tropical nut oils characterized by their high content of combined $C_{12}$ and $C_{14}$ acids and commonly referred to as the "coconut oil group" such as coconut oil, palm kernel oil, babassu oil, tucum nut oil, corozo nut oil and the like. The customary practice of preparing confectioners hard butter from these vegetable oils includes cooling the oil to promote crystallization of the higher melting constituents, then subjecting the thus grained oil to hydraulic pressing whereby the liquid constituent is separated. The solid constituent thus recovered may be directly converted to edible form or may be subjected to a hydrogenation procedure whereby its melting point is raised, or it may be admixed with a hard stock such as substantially completely hydrogenated cottonseed oil.

In the manufacture of confectioners' hard butter from oils of the coconut oil group, it is the desire to obtain a product which has sharp-melting characteristics similar to cocoa butter, and which melts substantially completely at body temperature, but which has resistance to temperatures just slightly below body temperature without possessing waxy characteristics.

By application of the present process to coconut oil or other oil of the coconut oil group as illustrated in the following examples, it is possible to prepare a confectioners' hard butter of equal quality without subjecting the fat to a costly crystallization and hydraulic pressing operation.

*Example 15.*—Refined and filtered coconut oil is thoroughly mixed with about 0.2% sodium methoxide as a 10% dispersion in xylene. The temperature of the mixture is gradually reduced to a final temperature of 60° F. over a period of several days. Thereafter the catalyst is inactivated in the usual manner and the product washed and filtered. A rearranged coconut oil thus produced had sharp-melting characteristics, the final melting point being 93.9° F., and had sufficiently good properties in other respects to serve as a confectioners' hard butter without graining or hydrogenation. It compared favorably with a product prepared by graining and pressing coconut oil and adding substantially completely hygrogenated cottonseed oil thereto to give it stability at the higher temperatures.

In place of the coconut oil, palm kernel oil and babassu oil may be used.

*Example 16.*—90 parts coconut oil and 10 parts substantially completely hydrogenated cottonseed oil were mixed with 0.12% sodium methoxide dissolved in a minimum quantity of methanol. The mixture was held in airtight containers and gradually reduced in temperature from 100° F. to 60° F. At the end of the rearrangement period, during which crystallization of a large proportion of solid glycerides took place and which extended over a period of 4 days, the catalyst was inactivated and the rearranged fat was washed, filtered, and deodorized. It had a capillary melting point of 98.6° F. and was a hard, brittle product at ordinary room temperature. At 90° F. it could be held for a number of hours with very little separation of liquid oil in the form of beads on the surface of the product. Thus the product was suitable for use without hydrogenation or graining as a confectioners' hard butter in the preparation of chocolate coatings, icings, etc.

Other hydrogenated fats such as peanut oil, soybean oil, sunflower seed oil, sesame oil, corn oil, and the like may be substituted for the cotton seed oil used in the preceding example.

In the application of the low temperature interesterification process to oils such as coconut oil which have a relatively low content of combined high melting fatty acid (e. g. stearic) and of combined low melting fatty acid (e. g. oleic), the change effected in certain physical characteristics such as increase in spread from the lowest melting to the highest melting constituent is not as marked as in the case of cottonseed oil or soybean oil. Thus although the melting point of coconut oil may be raised by application of the interesterification process in preparing such a fat for use in confectioners' hard butter, the amount of tri-unsaturated glyceride formed is not sufficient to detract materially from the sharp-melting characteristics of the fat. Furthermore, the constitution of coconut oil, for example, is such that the glycerides which precipitate during interesterification are predominantly saturated glycerides containing more than one kind of saturated fatty acid radical in each molecule, and such glycerides, I have found, seem to be more effective than triglycerides of a single saturated fatty acid in retaining liquid constituents on crystallization, whether they are mixed in as a solid solution or enmeshed in the crystalline structure. Accordingly the use of low temperature interesterification on oils of the coconut oil group is of outstanding value in the production of a higher melting fat with sharp-melting characteristics without employing expensive processing steps including hydrogenation or graining and pressing.

Examples 15 and 16 illustrate only two of the many ways in which the invention may be applied in the preparation of a confectioners' hard butter. Other processes may include hydrogenation of the rearranged product to give slightly higher melting points for greater stability of products produced therefrom when subjected to higher temperatures.

Also, if desired, the products may be subjected to a graining process wherein, for example, a small amount of liquid constituent is removed.

Instead of mixing hydrogenated oil with coconut oil prior to rearrangement, it is also possible to mix unhydrogenated oils such as corn oil, sunflower seed oil, rapeseed oil, olive oil, soybean oil, sesame seed oil, peanut oil, cotton seed oil, and the like, as well as other unhydrogenated oils such as palm oil with coconut oil or other oil of the coconut oil group, rearrange at low temperature with simultaneous crystallization, then hydrogenate to a desired degree to give a product of distinctive characteristics.

Various other combinations and modifications in above processes can be applied without departing from the spirit of the invention.

In all applications of the invention above described, the temperature at which most fats can begin to form solid crystals is below 140° F., in most cases below 120° F., and therefore the temperature at which the rearrangement is conducted in accordance with this invention for most practical applications is below such temperature but sufficiently high that a substantial proportion of the fat is liquid and sufficiently low to permit the crystallization from the liquid fat of solid triglyceride fats of low solubility formed in the rearrangement. It has been found for example that the reaction will take place at temperatures at which the fat appears to be solid but actually contains liquid fat entangled in the crystals of precipitated solid glycerides. As indicated in some of the above examples, such conditions actually exist in practical applications of the process, especially in the final stages of processing. Specifically, the process has been successfully operated at final temperatures as low as 32–40° F., but even lower temperatures may be employed if the nature of the product desired requires characteristics that are improved by the use of such low temperatures.

Ordinarily it will be advantageous to reduce the temperature during interesterification gradually or in steps to the final temperature decided upon. However, in some cases it will be preferable to conduct the rearrangement at nearly a constant temperature or at a low temperature reached by sudden cooling. My process is not limited to any set schedule of temperature treatment, although as indicated, the gradual reduction to the final temperature is preferred when a shortening product with high melting point and wide plastic range is desired.

Effective practice of the invention does not depend upon the use of any particular catalyst. Any molecular rearrangement catalyst which will promote the interchange of fatty acid radicals at the low temperatures required for crystallization is suitable for use.

It is not unlikely that the true catalyst for the rearrangement reaction is not the alkoxide or other compound added to the triglyceride, but rather a compound resulting from the reaction of such added compound with the triglyceride fat. For example, I have observed that almost immediately after the introduction of sodium methoxide into a fat there is formed substantially an equivalent amount of fatty acid methyl ester. It is the logical assumption, therefore, that the sodium has combined with the triglyceride fat in some form, and according to my theory this sodium-fat compound constitutes the active catalyst constituent in this particular instance.

My experience has led me to the conclusion that this formation of active catalyst in the glyceride mixture can take place either by direct reaction of alkali metal with triglyceride fat with displacement of hydrogen, or by the reaction of one or more of a great number of compounds which are capable of forming alkoxides by reaction with alcoholic substances. Such compounds will form alkoxides and, which is more to the point, will react with fats to form active catalyst when the material with which the metal or other cation is combined is not so acidic as to hold the cation in combination and prevent reaction with fat. Thus, for example, potassium or sodium in combination with practically any material less acidic than phenol can form the catalyst when added to the fat. Sodium phenoxide appears to be on the borderline between what may be referred to in the present sense as active and inactive materials because only slight activity of this material in low temperature molecular rearrangement is noted when liberal quantities are added to the fat. Compounds of sodium with materials more acidic than phenol (with fatty acid, for example, in the form of soap) will not react with the fat to form an active catalyst at the temperatures required in the practice of this invention.

In the above examples I have chosen to illustrate my process principally with the use of an alkoxide compound such as sodium methoxide. This specific compound is a practical material for use in promoting the rearrangement in accordance with my invention because of the ready occurrence of the raw materials and its ease of preparation, and therefore the major portion of my work on rearrangement processes involving application of the principles set forth herein has included the use of sodium methoxide. The methoxides of other alkali metals such as lithium, and especially potassium, are also active in forming catalytic materials with the fat. The methoxides of alkaline earth metals such as calcium also have been found to possess some activity in the range of temperatures required for the reaction. My work has also indicated that methoxides, in which the cation is the tetrasubstituted ammonium radical, such as tetramethyl ammonium methoxide and lauryl benzyl dimethyl ammonium methoxide also show activity in the reaction of the present invention.

In addition to the methoxides, the corresponding ethoxides, propoxides, butoxides, and alkoxides made from alcoholic compounds in general, such as lauryl alcohol, ethylene glycol, oleic acid monoglyceride, and others may be employed. Moreover I have discovered that the addition of alkali-metal-organic compounds containing the alkali metal atom directly bound to a carbon atom as in triphenylmethyl sodium or to a nitrogen atom as in potassium pyrrole will result in the promotion of the rearrangement as conducted by the present process. The addition of a suspension of finely divided metallic potassium or sodium in xylene or of an anhydrous suspension of potassium hydroxide in a hydrocarbon solvent consisting essentially of undecane has also resulted in the promotion of molecular rearrangement at low temperature.

Because of the great variety of materials that may be used to form the active catalyst and because the actual structure of the catalytic materials formed is as yet not accurately known, the catalytic materials are generically referred to in the claims as "low temperature molecular rearrangement catalysts."

Amounts of low temperature molecular rearrangement catalyst equivalent to 0.5 per cent by weight of sodium methoxide based on the weight of the fat may be employed, but there is no particular advantage in employing quantities much in excess of 0.2 per cent. Even small quantities, such as 0.03 per cent, are effective in promoting the rearrangement at low temperature but I have found that the reaction proceeds at a rather low rate unless at least 0.05 per cent is employed. My preferred range of catalyst usage is the equivalent of from about 0.05 per cent to about 0.5 per cent sodium methoxide.

Such catalysts as may be used in carrying out my invention are highly efficient in effecting changes in molecular structure, that is, the regrouping of fatty acid radicals, and for this reason it is preferable to render the catalysts inactive after the desired arrangement has taken place and before the temperature of the fat is allowed to rise appreciably so that substantially no modification results during subsequent handling of the fat. I have noted, for example, that merely heating the rearranged fat in the presence of active catalyst to a temperature at which the crystallized portion becomes liquid, as may be necessary in compounding, will permit an undesirable reverse rearrangement in which the saturated triglyceride content decreases in a distribution tending toward the random arrangement obtained in the ordinary molecular interchange reactions conducted wholly in the liquid phase. Thus, in order to retain the degree and kind of rearrangement effected at low temperature, it is preferable to treat the mixture containing the catalyst with an acid reacting compound such as hydrochloric acid, phosphoric acid, carbonic acid, glacial acetic acid, etc., and thereby inactivate the catalyst before any undesirable reversion in molecular rearrangement takes place. If the rearranged fat is fairly fluid or is in the condition of a slurry, treatment with the acid material is a simple procedure. If, however, the fat after rearrangement is solid, or substantially so, it may be necessary to reduce it to granular form before treatment with the acid in order to inactivate the catalyst effectively.

In the use of the alkoxide catalysts in the practice of my invention, the usual precautions of having the oil dry and neutral, the catalyst finely divided and well dispersed, and of excluding oxygen and carbon dioxide during the reaction, should be observed in order to achieve optimum results.

As will be noted from examples given above, two tests or procedures are employed to obtain an indication of the amount of solid triglyceride in the oil. The first of these involves the crystallization of the solid triglycerides from solution of the fat in petroleum ether. In such a test, a small amount of the fat, such as 20 grams, is mixed with 10 volumes or 200 ml. of petroleum ether. The fat is thoroughly dissolved and the solution thus formed is cooled to a temperature of 40 to 50° F. and held at that temperature for about 24 hours. It is preferable to use a 50° F. temperature in working with fats having about 25 per cent or more of saturated triglyceride, whereas for fats of lower content, a 40° F. temperature is preferable. At the end of the period, the solid triglyceride precipitated is filtered off by suction at the temperature of crystallization, washed with fresh petroleum ether at the same temperature, dried and weighed. An iodine value determination will indicate the degree of saturation of the precipitated glyceride. The per cent saturated triglyceride obtained after allowing for the unsaturated glycerides represented by the iodine value, which is usually small, may be taken as a minimum percentage for the trisaturated glycerides. The true percentage will be slightly greater in most cases because of the solution of a small amount of the trisaturated glyceride in the petroleum ether.

The second procedure which has been used with some advantage involves dissolving the fat in 4 volumes of a solvent mixture consisting of 93 parts acetone and 7 parts ethanol, allowing the high melting fraction to crystallize at 70° F., then filtering off the solids and washing with about one volume of solvent at 70° F. The combined filtrate and washings may then be cooled to 32° F. to crystallize an intermediate melting fraction consisting in a large part of triglycerides containing in combined form two molecules of high melting fatty acid and one molecule of a low melting fatty acid. The results obtained in the first crystallization according to this procedure are substantially the same as those obtained with the use of 10 volumes of petroleum ether at 40° F.

Having thus described my invention, what I claim and desire to secure by Letters Patent is:

1. The process of treating fats and fatty oils to modify their chemical and physical characteristics and to improve their usefulness in the manufacture of edible products, which comprises intimately contacting an edible fat glyceride mixture, constituted of combined fatty acids whose molecular structures differ in respects affecting solubility of glycerides thereof in the glyceride system, with a low temperature molecular rearrangement catalyst at a temperature below 140° F. and within a range of temperature of which the lower limit is the lowest temperature at which a portion of the glyceride mixture is liquid and the upper limit is the highest temperature at which higher melting triglyceride molecules can crystallize in the liquid glyceride as they are formed by rearrangement, maintaining the temperature of the glyceride mixture within said range while progressive crystallization of higher melting triglyceride molecules formed in the rearrangement takes place and until a substantial increase in the proportion thereof has occurred, inactivating the catalyst, and converting the glyceride mixture into an edible product.

2. The process of making a shortening product comprising intimately contacting an edible fat glyceride mixture, constituted of combined fatty acids whose molecular structures differ in respects affecting solubility of glycerides thereof in the glyceride system, with a low temperature molecular rearrangement catalyst at a temperature, below 140° F., at which a substantial portion of the glyceride mixture is liquid, to cause rearrangement of the fatty acid radicals in the glyceride molecules, the temperature being sufficiently low to permit crystallization of solid triglycerides of low solubility as same are formed, maintaining the temperature of the glyceride mixture within such limits while progressive crystallization of solid triglycerides of low solubility takes place, inactivating the catalyst, and forming the resulting glycerides into a plastic mass.

3. The process of making plastic shortening comprising intimately contacting an edible fat glyceride mixture containing in combined form unsaturated fatty acids and from about 15 per cent to about 40 per cent saturated fatty acids having at least 16 carbon atoms, with a low temperature molecular rearrangement catalyst at a temperature, below 120° F., at which a substantial portion of the glyceride mixture is liquid, to cause rearrangement of the fatty acid radicals in the glyceride molecules, the temperature being sufficiently low to permit crystallization of saturated triglycerides of low solubility as same are formed, maintaining the temperature of the glyceride mixture within such limits while progressive crystallization of saturated triglyceride molecules takes place and until a substantial increase in the proportion thereof has occurred, inactivating the catalyst, and chilling and forming the resulting glycerides into a plastic mass.

4. The process of claim 3 in which the temperature at which the catalyst is inactivated is not substantially higher than the final temperature of molecular rearrangement.

5. The process of making plastic shortening comprising intimately contacting an edible fat glyceride mixture containing in combined form unsaturated fatty acids and from about 15 per cent to about 40 per cent saturated fatty acids having at least 16 carbon atoms, with a low temperature molecular rearrangement catalyst at a temperature, below 120° F., at which a substantial portion of the glyceride mixture is liquid, to cause rearrangement of the fatty acid radicals in the glyceride molecules, the temperature being sufficiently low to permit crystallization of saturated triglycerides of low solubility as same are formed, maintaining the temperature of the glyceride mixture within such limits while progressive crystallization of saturated triglycerides takes place and until the product contains from about 5 per cent to about 20 per cent thereof and sufficient to impart stability in the range of normal room temperature to plasticized fat made therefrom, inactivating the catalyst, and chilling and forming the resulting glycerides into a plastic mass.

6. The process of claim 5 in which the edible fat glyceride contains a substantial amount of glycerides derived from cottonseed oil.

7. The process of claim 5 in which the edible fat glyceride comprises the solid glyceride fraction obtained from the winterizing of cottonseed oil in predominant amount.

8. The process of making plastic shortening comprising intimately contacting an edible fat glyceride mixture constituted of combined fatty acids whose molecular structures differ in respects affecting solubility of glycerides thereof in the glyceride system, with a low temperature molecular rearrangement catalyst at a temperature, below 120° F., at which a substantial portion of the glyceride mixture is liquid, to cause rearrangement of the fatty acid radicals in glyceride molecules, the temperature being sufficiently low to permit crystallization of solid triglycerides of low solubility as same are formed, maintaining the temperature of the glyceride mixture within such limits while progressive crystallization takes place and until the quantity of solid triglycerides formed is greater than the quantity required to give the product a desirable consistency when plasticized, inactivating the catalyst, adjusting the solid triglyceride content to an amount which will give a rearranged glyceride mixture suitable for conversion into a product having plastic consistency at temperatures in the normal range or room temperatures, and chilling and forming the resulting glyceride mixture into a plastic mass.

9. A process of making plastic shortening comprising intimately contacting an edible fat glyceride mixture constituted of combined fatty acids whose molecular structures differ in respects affecting solubility of glycerides thereof in the glyceride system, with a low temperature molecular rearrangement catalyst at a temperature, below 120° F., at which a substantial portion of the glyceride mixture is liquid, to cause rearrangement of fatty acid radicals in glyceride molecules, the temperature being sufficiently low to permit crystallization of saturated triglycerides of low solubility as same are formed, maintaining the temperature of the glyceride mixture within such limits while progressive crystallization takes place and until more than 20 per cent crystallized saturated triglycerides are formed, inactivating the catalyst, adjusting the saturated triglyceride content to an amount less than 20 per cent which will give a glyceride mixture suitable for conversion into a product having plastic consistency at temperatures in the normal range of room temperatures, and chilling and forming the resulting glyceride mixture into a plastic mass.

10. The process of claim 9 in which the edible fat is refined palm oil.

11. The process of claim 9 in which the adjustment of the saturated triglyceride content comprises adding to the rearranged fat a glyceride oil to give a mixture suitable for conversion to a product having plastic consistency at temperatures in the normal range of room temperatures.

12. The process of claim 9 in which the edible fat is refined palm oil and in which the adjustment of the saturated triglyceride content comprises adding a glyceride oil substantially liquid at room temperature and thereby adjusting the saturated triglyceride content to a range from about 5 per cent to about 20 per cent.

13. A process of making plastic shortening comprising intimately contacting refined palm oil with a low temperature molecular rearrangement catalyst at a temperature from about 70° F. to about 100° F. to cause rearrangement of fatty acid radicals in glyceride molecules, maintaining the temperature within such limits while progressive crystallization takes place and until more than 20 per cent saturated triglycerides are formed, inactivating the catalyst, adding refined cottonseed oil and thereby adjusting the saturated triglyceride content to a range from about 5 per cent to about 20 per cent and to an amount which will give a mixture of glycerides suitable for conversion into a product having plastic consistency at temperatures in the normal range of room temperatures, and chilling and forming the resulting mixture into a plastic mass.

14. The process of claim 9 in which the adjustment of the saturated triglyceride content comprises separating saturated triglyceride from the rearranged mixture.

15. A process of making plastic shortening comprising intimately contacting a partially hydrogenated naturally occurring edible fat containing in combined form a proportion of unsaturated fatty acid at least 20 per cent saturated fatty acids having at least 16 carbon atoms, with a low temperature molecular rearrangement catalyst at a temperature, below 120° F., at which a substantial portion of the fat is liquid, to cause rearrangement of fatty acid radicals in glyceride molecules, the temperature being sufficiently low to permit crystallization of saturated triglycerides of low solubility as same are formed, maintaining the temperature of the fat within such limits while progressive crystallization takes place and until more than 20 per cent saturated triglycerides are formed, inactivating the catalyst, adjusting the saturated triglyceride content by fractional crystallization and separation to a range from about 5 per cent to about 20 per cent and to an amount which will give a glyceride mixture suitable for conversion into a product having plastic consistency at temperatures in the normal range of room temperatures, and chilling and forming the resulting glyceride mixture into a plastic mass.

16. A process of making plastic shortening comprising intimately contacting a mixture of edible glycerides constituted of combined fatty acids whose molecular structures differ in respects affecting solubility of glycerides thereof in the glyceride system, and containing at least 20 per cent saturated fatty acids having at least 16 carbon atoms in combined form, with a low temperature molecular rearrangement catalyst at a temperature, below 120° F., at which a substantial portion of the glyceride mixture is liquid, to cause rearrangement of fatty acid radicals in glyceride molecules, the temperature being sufficiently low to permit crystallization of saturated triglycerides of low solubility as same are formed, maintaining the temperature of the glyceride mixture within such limits while progressive crystallization takes place and until more than 20 per cent saturated triglycerides are formed, inactivating the catalyst, fractionally crystallizing a portion of the saturated triglycerides and separating same from the uncrystallized portion of the rearranged mixture, thereafter adding to the uncrystallized portion of the rearranged mixture an amount of said saturated triglycerides resulting from said fractional crystallization and separation to produce a glyceride mixture having from about 5 per cent to about 20 per cent saturated triglycerides and an amount which will render the mixture suitable for conversion into a product having plastic consistency at temperatures in the normal range of room temperatures, and chilling and forming the resulting glyceride mixture into a plastic mass.

17. A process of treating fats and fatty oils to modify their chemical and physical characteristics and to improve their usefulness in the manufacture of edible products, which comprises partially hydrogenating a mixture of glycerides comprising unsaturated glycerides to yield a hydrogenated fat constituted of combined fatty acids including isooleic acid, which combined fatty acids have molecular structures differing in respects affecting solubility of glycerides thereof in the glyceride system, intimately contacting said hydrogenated fat with a low temperature molecular rearrangement catalyst at a temperature below 120° F. and within a range of temperature of which the lower limit is the lowest temperature at which a portion of the glyceride mixture is liquid and the upper limit is the highest temperature at which higher melting triglyceride molecules can crystallize in the liquid glyceride as they are formed by rearrangement, maintaining the temperature of the glyceride mixture within said range while progressive crystallization of higher melting triglyceride molecules formed in the rearrangement takes place and until a substantial increase in the proportion thereof has occurred, and inactivating the catalyst, and converting the glyceride mixture into an edible product.

18. A process of treating fats and fatty oils to modify their chemical and physical characteristics and to improve their usefulness in the manufacture of edible products which comprises intimately contacting an edible fat glyceride mixture, constituted of combined fatty acids whose molecular structures differ in respects affecting solubility of glycerides thereof in the glyceride system, with a low temperature molecular rearrangement catalyst at a temperature below 140° F. and within a range of temperature of which the lower limit is the lowest temperature at which a portion of the glyceride mixture is liquid and the upper limit is the highest temperature at which higher melting triglyceride molecules can crystallize in the liquid glyceride as they are formed by rearrangement, maintaining the temperature of the glyceride mixture within said range while progressive crystallization of higher melting triglyceride molecules formed in the rearrangement takes place and until a substantial increase in the proportion thereof has occurred, adding a liquid oil to the rearranged mixture, permitting further molecular rearrangement to take place between the added liquid oil and the liquid constituent of the rearranged mixture, and inactivating the catalyst.

19. As a plastic shortening, a fatty triglyceride mixture subjected to molecular rearrangement and formed into a plastic mass in accordance with the process of claim 2, said shortening having from about 5 per cent to about 20 per cent of a solid triglyceride fraction constituted predominantly of combined saturated fatty acids having at least 16 carbon atoms, and from about 95 per cent to about 80 per cent of a triglyceride fraction constituted in substantial proportion of combined unsaturated fatty acids, said shortening being plastic in the ordinary range of room temperature, showing a change in plastic consistency of not substantially more than 80 points penetration with change in temperature from 50° F. to 80° F. as measured on the A. S. T. M. grease penetrometer and, by reason of such molecular rearrangement, having a content of triglycerides of solid fatty acids substantially greater than the original triglyceride mixture and than could exist under conditions of ester interchange of the original triglyceride mixture wholly in the liquid phase, but having substantially the same relative overall proportions of combined saturated and unsaturated fatty acids as the triglyceride mixture prior to molecular rearrangement.

EDDY W. ECKEY.

REFERENCES CITED

The following references are of record in the file of this patent:

UNITED STATES PATENTS

| Number | Name | Date |
|---|---|---|
| 1,873,513 | Van Loon | Aug. 23, 1932 |
| 2,154,452 | Jenness | Apr. 18, 1939 |
| 2,205,381 | Eckey | June 25, 1940 |
| 2,290,609 | Goss | July 21, 1942 |
| 2,309,949 | Gooding | Feb. 2, 1943 |
| 2,340,104 | Brown | Jan. 25, 1944 |

FOREIGN PATENTS

| Number | Country | Date |
|---|---|---|
| 249,916 | Great Britain | 1926 |